(12) United States Patent
Anderson et al.

(10) Patent No.: US 7,413,626 B2
(45) Date of Patent: Aug. 19, 2008

(54) ADHESIVE FILM REMOVAL METHOD AND APPARATUS

(75) Inventors: Conrad V. Anderson, Minneapolis, MN (US); John R. David, Stillwater, MN (US); Ronald S. Steelman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1437 days.

(21) Appl. No.: 09/759,993

(22) Filed: Jan. 12, 2001

(65) Prior Publication Data

US 2002/0092611 A1 Jul. 18, 2002

(51) Int. Cl.
*B32B 38/10* (2006.01)
(52) U.S. Cl. ...................... 156/344; 156/584
(58) Field of Classification Search ................ 156/344, 156/584
See application file for complete search history.

(56) References Cited

U.S. PATENT DOCUMENTS

| | | | |
|---|---|---|---|
| 3,617,424 A * | 11/1971 | Smith | 156/344 |
| 4,204,904 A | 5/1980 | Tabor | |
| 4,631,110 A * | 12/1986 | Tsumura et al. | 156/344 |
| 4,640,735 A * | 2/1987 | Murray et al. | 156/344 |
| 4,751,121 A | 6/1988 | Kühnel et al. | |
| 4,752,346 A * | 6/1988 | Platzer | 156/344 |
| 4,775,438 A * | 10/1988 | Funakoshi et al. | 156/230 |
| 4,861,411 A * | 8/1989 | Tezuka | 156/242 |
| 4,867,816 A | 9/1989 | Suiter | |
| 4,944,514 A | 7/1990 | Suiter | |
| 5,122,959 A | 6/1992 | Nathanson et al. | |
| 5,358,591 A * | 10/1994 | Candore | 156/344 |
| 5,492,590 A * | 2/1996 | Sakai | 156/249 |
| 5,540,809 A * | 7/1996 | Ida et al. | 156/344 |
| 5,800,919 A | 9/1998 | Peacock et al. | |
| 5,810,962 A * | 9/1998 | Annenkov et al. | 156/344 |
| 5,891,297 A | 4/1999 | Stadtmueller | |
| 5,891,298 A * | 4/1999 | Kuroda et al. | 156/241 |
| 6,595,261 B2 * | 7/2003 | Fitterer | 156/584 |

FOREIGN PATENT DOCUMENTS

| | | |
|---|---|---|
| DE | 2160144 | 7/1973 |
| DE | 198 10 010 | 2/1999 |

(Continued)

OTHER PUBLICATIONS

Brady, H., "Ten Steps to Successful Vinyl Truck Lettering," *SignCraft Magazine*, Issue 74, 3 pages (Jan./Feb. 1994).

*Primary Examiner*—Mark A Osele
(74) *Attorney, Agent, or Firm*—Colene H. Blank

(57) ABSTRACT

The present invention provides adhesive film removal methods and apparatus. The removal methods and apparatus involve apply tension over the width of the adhesive film, thereby removing the film from the substrate along the release line that extends over the width of the film. The methods and apparatus are particularly useful in removing large-scale graphic films from substrates such as truck trailers, vans, walls, signs and other large surfaces. The tension applied to the adhesive film during removal is preferably uniform across the width of the film, thereby reducing the risk of the film tearing or breaking during removal. The release line is advanced during removal along the length of the film until the entire film is removed from the substrate.

14 Claims, 4 Drawing Sheets

FOREIGN PATENT DOCUMENTS

| | | |
|---|---|---|
| DE | 19842159 | 4/1999 |
| DE | 19808931 | 9/1999 |
| DE | 197 33 935 C2 | 11/1999 |
| EP | 0 354 230 B1 | 3/1992 |
| EP | 0 787 539 A2 | 8/1997 |
| EP | 0 787 539 A3 | 8/1997 |
| FR | 2 300 249 | 9/1976 |
| FR | 2 643 487 A1 | 8/1990 |
| FR | 2 743 963 A1 | 7/1997 |
| GB | 1018175 | 1/1966 |
| GB | 1135928 | 12/1968 |
| JP | 63-059517 | 3/1988 |
| JP | 01-123723 | 5/1989 |
| WO | WO 89/05829 | 6/1989 |
| WO | WO 92/17870 | 10/1992 |
| WO | WO 97/31077 | 8/1997 |
| WO | WO 98/29516 | 7/1998 |
| WO | WO 00/43196 | 7/2000 |
| WO | WO 00/43220 | 7/2000 |

\* cited by examiner

ADHESIVE FILM REMOVAL METHOD AND APPARATUS

FIELD OF THE INVENTION

The present invention relates to the field of adhesive film removal methods and apparatus.

BACKGROUND

Adhesive coated films are often used or applied to a variety of surfaces for reasons such as advertisement, decoration, protection, etc. In some instances these films may be used in place of painting to protect surfaces or to provide a uniform appearance, such as to a fleet of trucks. Regardless of their specific use, these films, which are often exposed to environmental conditions, have a finite life and must be removed prior to replacement.

Removal of these adhesive coated films presents difficulties as the films are typically very large, e.g., typically as large as 3 meters wide by 16 meters long. The adhesives used to apply the films to the substrates also typically have a relatively high adhesion, making their removal somewhat difficult. Removal is currently accomplished by hand with an individual attempting to pull the film off of the substrate. Many of the pressure sensitive adhesives used to attach the films have adhesion values with the underlying substrate in excess of 3 pounds per inch, with many an excess of five pounds per inch. As a result, it is difficult, if not impossible, for an individual to exert sufficient force to remove the entire sheet of graphics across its width at the same time.

As a result, the individual is forced to remove small sections of the film, with the film often breaking during removal because of the forces concentrated at the removal location. To assist with removal, many individuals often cut the film into strips while on the substrate and remove the strips individually. Drawbacks to this approach however include the potential for damage to the underlying substrate as well as the additional labor required to cut the film prior to removal.

SUMMARY OF THE INVENTION

The present invention provides adhesive film removal methods and apparatus. The removal methods and apparatus involve apply tension over the width of the adhesive film, thereby removing the film from the substrate along the release line that extends over the width of the film. The methods and apparatus are particularly useful in removing large-scale graphic films from substrates such as truck trailers, vans, walls, signs and other large surfaces.

The tension applied to the adhesive film during removal is preferably uniform across the width of the film, thereby reducing the risk of the film tearing or breaking during removal. The release line is advanced during removal along the length of the film until the entire film is removed from the substrate.

One preferred apparatus for removing adhesive films according to the present invention includes a roll that is operably connected to a winding mechanism that can supply adequate torque to remove the adhesive film from the substrate. The winding mechanism may include a torque limiter to reduce or prevent the likelihood of breaking the film during removal. Power for the winding mechanism may be provided by any suitable device, e.g., electric motor, airmotor, hydraulic motor, etc.

Optionally, it may be desired to distribute the tension forces applied to the film back to the substrate in the form of a compressive force with the compressive force being applied to the substrate proximate the release line. The compressive force may be applied by any suitable structure, although a roll is typically preferred to avoid damage to the underlying substrate.

The tension forces may not need to be applied back to the substrate where the film removal apparatus itself is sufficiently rigid and robust to withstand the tension applied during removal of the film.

The apparatus and methods may be particularly useful to assist in the removal of adhesive-coated plastic films, particularly vinyl films, from large area surfaces after the films have reached the end of their useful life. Some of the most common surfaces include truck sides, walls, signs, portions of a building, vehicles, etc. Extensive time and labor may be required to remove adhesive films from these large surfaces.

Another advantage of the invention is that the apparatus and methods are effective on both fabric-sided trucks and metallic-sided trucks, making one technique versatile for a graphics film remover.

The film removal apparatus of the present invention may advantageously be used in combination with the vacuum-assisted adhesive film laminating apparatus disclosed in U.S. patent application Ser. No. 09/236,806 filed on Jan. 25, 1999 titled INTERSECTING HEAT AND PRESSURE FILM APPLICATOR AND METHODS OF USING SAME and U.S. patent application Ser. No. 09/479,648 filed on Jan. 7, 2000 titled METHOD OF APPLYING ADHESIVE COATED FILM; and U.S. patent application Ser. No. 09/576,624 filed on May 23, 2000 titled STEERED VACUUM-ASSISTED LAMINATING APPARATUS AND METHODS OF USE.

Briefly, those apparatus provide automated systems for laminating an adhesive film to a substrate. The apparatus of the present invention may be used to remove films thus laminated. Films laminated by those systems may be even more difficult to remove by hand, thereby making use of the present invention even more advantageous.

When used in connection with a vacuum-assisted lamination system, it may be preferred to mount the film removal apparatus of the present invention ahead of the laminating apparatus, thereby providing an integrated system that can be used to remove an existing adhesive film from the substrate and replacing it with a new film in one pass. Such an integrated system may also take advantage of the steering and other features provided with the lamination systems.

These and other features and advantages of the present invention are discussed below in connection with various illustrative embodiments of the invention.

DETAILED DESCRIPTION OF ILLUSTRATIVE EMBODIMENTS OF THE INVENTION

The present invention provides adhesive film removal methods and apparatus useful for removing adhesive films from substrates. The removal methods and apparatus involve the application of tension over the entire width of the adhesive film. By applying tension over the entire width of the adhesive film removal of the film from the substrate proceeds along the release line that extends over the entire width of the film. The tension applied to the adhesive film during removal is preferably uniform across the width of the film to reduce or prevent tearing or breakage of the film during removal.

It may be preferred that the methods and apparatus of the invention be used in connection with the removal of large-scale adhesive films from substrates. For the purposes of the present invention, a "large-scale adhesive film" is a film having a width of 70 centimeters or more and a length of 2 meters or more.

Figure 1:
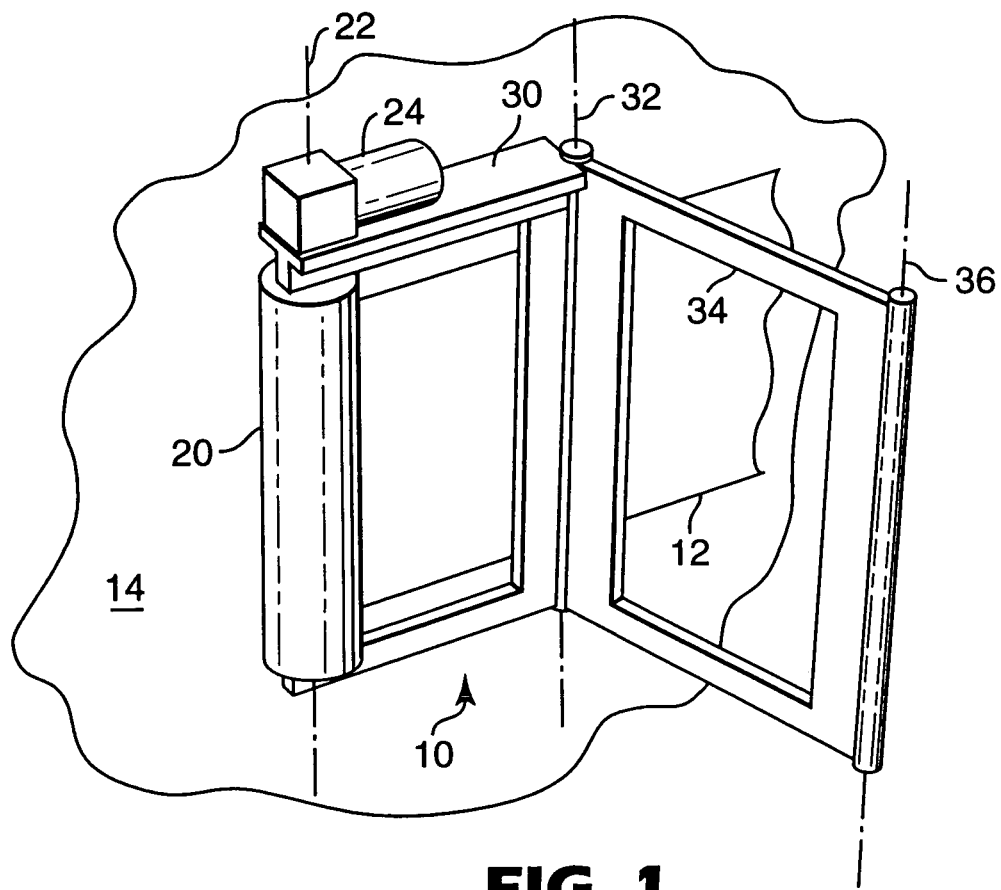
FIG. 1 is a perspective view of one film removal apparatus according to the present invention.
Figure 2:
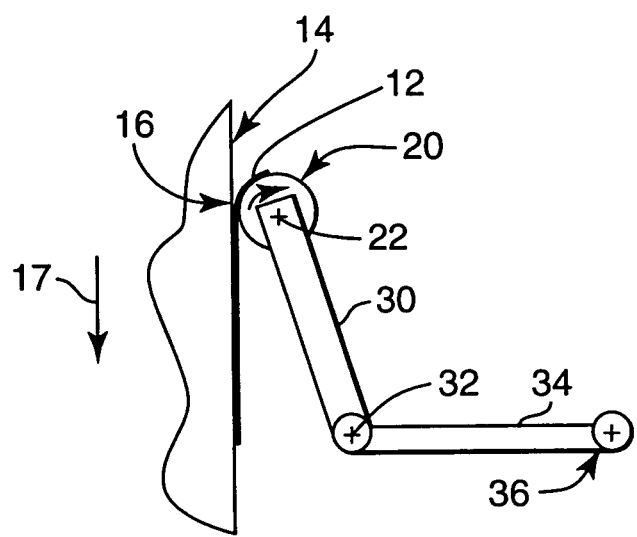
FIG. 2 is a view of the film removal apparatus of FIG. 1 taken upward along the longitudinal axis 22 in FIG. 1.

FIGS. 1 and 2 depict one illustrative embodiment of an apparatus useful in connection with the methods out of the present invention. The apparatus 10 includes a winding roll 20 that rotates about a longitudinal axis 22. During removal of the adhesive film 12 from the substrate 14, the winding roll 20 is rotated about its axis 22 to remove film 12 from the substrate 14 along a release line 16 as seen in FIG. 2.

The substrate 14 on which the adhesive film 12 is laminated may be flat, or it may be curved such as, e.g., a roll. Furthermore, substrate 14 may be another film located on a flat or curved surface and to which the film 12 is laminated. The substrate 14 may be rigid, e.g., a building wall, truck trailer side, etc., or it may be flexible, but under tension such as, e.g., a fabric surface used on a truck trailer.

The winding roll 20 is preferably driven by a motor 24 which rotates the roll 20 about its longitudinal axis 22. The motor 24 can take any suitable configuration. For example, the motor 24 may be electric motor, and air motor, a hydraulic motor, etc. It may be desirable that the motor 24 also includes a torque limiter to limit the maximum amount of torque that can be applied to the adhesive film 12 by the winding roll 20 during the removal process. Torque limiting may be accomplished in a variety of manners such as by an additional torque limiting mechanism located between the motor 24 and the winding roll 20 (e.g., a clutch), by limiting the current to an electric motor, limiting the air pressure provided to an air motor, limiting the hydraulic fluid pressure provided to a hydraulic motor, etc. Other techniques of limiting torque will be known to those skilled in the art.

The winding roll 20 is mounted on a roll frame 30 that is preferably, itself, mounted for rotation about an axis 32. By allowing the roll frame 30 to rotate about axis 32, the winding roll 20 may more closely followed the contour of the substrate 14 on which adhesive film 12 is located. In addition, rotation of the roll frame 30 will also compensate for the increasing diameter of the winding roll 20 if the adhesive film is wound on that roll as it is removed from the substrate 14.

The roll frame 30 may also be rotatably connected to a subframe 34 which, itself, rotates about an axis 36. As a result, the winding roll 20 may be mounted on the end of a two beam linkage formed by roll frame 30 and subframe 34. That additional axis of rotation (36) may provide for additional compliance and movement of the winding roll 20 when removing the adhesive film 12 from the substrate 14.

During the removal process, the apparatus 10 is preferably moved relative to the substrate 14 in the direction of arrow 17 in FIG. 2. That movement may alternatively be described as transverse to the width of the film 12 (where the film length is transverse to its width). Relative movement between the apparatus 10 and the substrate 14 is all that is required. It may often be desired to move the film removal apparatus 10 while the substrate 14 remains stationary, although in some instances the substrate 14 may be moved relative to a stationary apparatus 10 or both the apparatus 10 and the substrate 14 may move during film removal.

As the film removal apparatus 10 depicted in FIGS. 1 and 2 operates, the tension applied to the adhesive film 12 during removal from the substrate 14 may be transferred directly to the substrate 14 (particularly where the frame 30 and winding roll 20 are supported separately from the substrate 14. More typically, however, the tension applied to the adhesive film 12 during the removal process will be transferred back to the substrate 14 in the form of a compressive force by the roll 20. That compressive force will be applied at the or slightly ahead of the release line 16. Although in many instances this configuration may be suitable, it may be desirable to separate the release line 16 and compressive force by some distance to avoid increasing the adhesive forces generated between the adhesive film 12 and the substrate 14 just prior to removal of that film 12.

Figure 3:
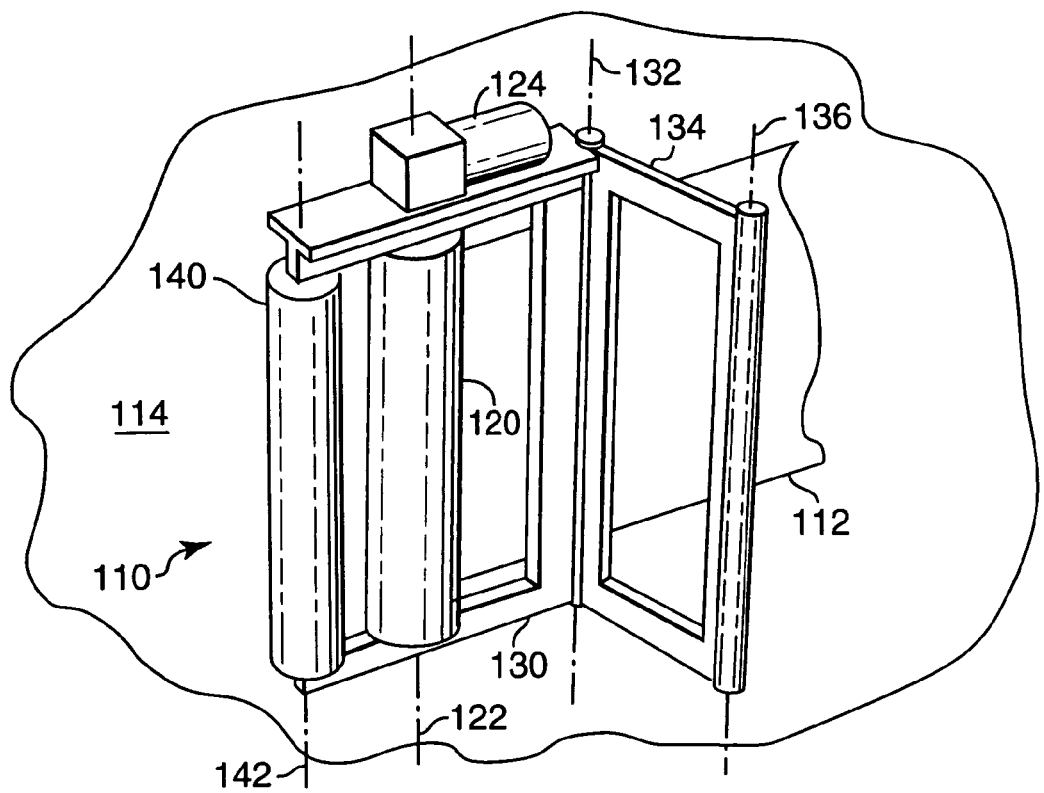
FIG. 3 is a perspective view of another film removal apparatus according to the present invention.
Figure 4:
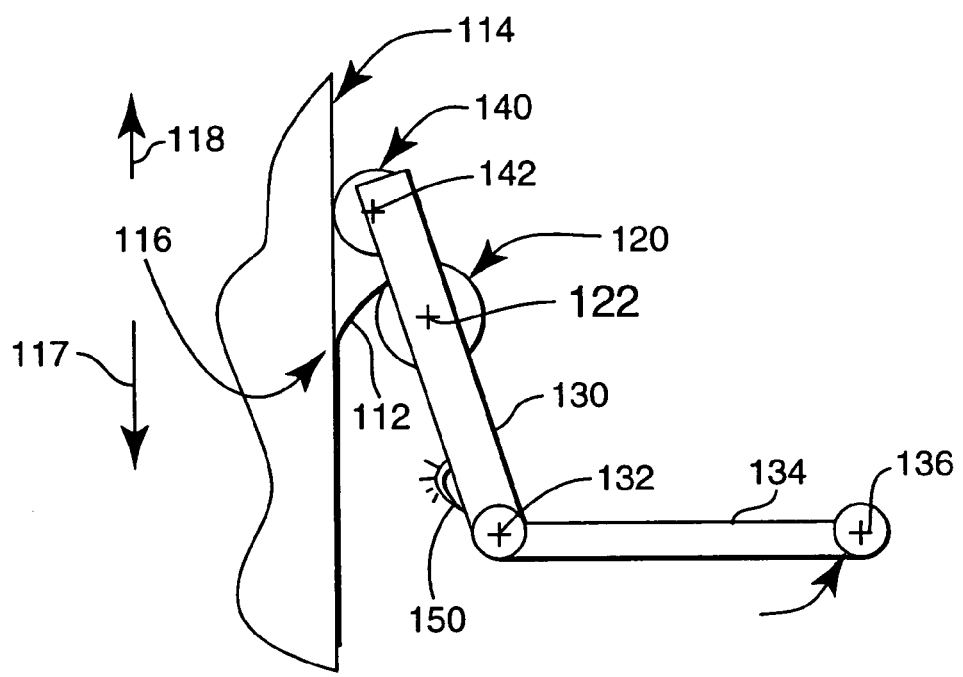
FIG. 4 is a view of the film removal apparatus of FIG. 3 taken along the longitudinal axis 122 in FIG. 3.

FIGS. 3 and 4 depict one illustrative embodiment of an apparatus similar to that depicted in FIGS. 1 and 2, but in which a compressive force used to support the winding roll is removed from the release line 116 along which adhesive film 112 is removed from the substrate 114.

The apparatus 110 of FIGS. 3 and 4 includes a winding roll 120 which rotates about a longitudinal axis 122 and is driven by a motor 124 to rotate about that axis. A torque limiter similar to that used in connection with apparatus 10 of FIGS. 1 and 2 may also be included in the apparatus 110. The winding roll 120 is mounted on a roll frame 130 that rotates about an axis 132. In turn, the roll frame 130 is also attached to a subframe 134 which, itself, rotates about axis 136 in a manner similar to the two-beam linkage described above in connection with apparatus 10.

An additional optional component it is depicted in FIGS. 3 and 4 in the form of a support roll 140 mounted on roll frame 130. The support roll 140 is mounted on roll frame 130 in a manner that allows for rotation of support roll 140 about an axis 142. As seen in FIG. 4, the support roll 140 rides along the substrate 114 during the removal process. The support roll 140 preferably supports the winding roll 120 away from contact with the adhesive film 112 while that film 112 is still laminated to the substrate 114. Rather, the winding roll 120 applies only tension to the adhesive film 112, which is removed from the substrate 114 along release line 116.

Much of the tension force applied to the adhesive film 112 during removal by the winding roll 120 can then be transferred back to the substrate 114 in the form of a compressive force by the support roll 140. This arrangement may be beneficial in that the structures needed to support frame 130 relative to the substrate 114 may be reduced by balancing the tension force required to remove adhesive film 112 from substrate 114 with a compressive force provided by support roll 140 on substrate 114.

An additional advantage may be found in the relative positions of the release line 116 and the location of the support roll 140 and corresponding compressive forces applied to the substrate 114 by the support roll 140. By applying the compressive force to the substrate 114 behind the release line (relative to the direction of movement of apparatus 110 and corresponding release line 116), that compressive force will not increase any adhesion between the adhesive film 112 and the substrate 114 just prior to removal.

Another feature of the apparatus 110 and method of removing adhesive film 112 using the apparatus 110 is that the peel angle, i.e., the included angle formed between the adhesive film 112 and the substrate 114 at the release line 116 can be at least partially, if not completely, controlled by varying the rotational speed of the winding roll 120. Control over the peel angle may be useful to reduce the amount of adhesive left on the substrate 114 after the adhesive film 112 is removed, to reduce or prevent stretching and/or breakage of the film 112, etc.

Assuming that the rate of travel of the apparatus 110 in the direction of arrow 117 is uniform, increasing the rotational speed of the winding roll 120 will move the release line 116 farther ahead of the support roll 140 (in the direction of arrow 117). The result is that the peel angle formed between the adhesive film 112 and the substrate 114 will be smaller. Conversely, decreasing the rotational speed of the winding roll 120 will move the release line 116 towards the support roll 140 (in the opposite direction of arrow 117). The result is that the peel angle formed between the adhesive film 112 and the substrate 114 will be larger.

The apparatus 110 may also be operated in the direction of arrow 118 under conditions where the pressure of the support roll 140 does not adversely affect removal of the film 112. Operation in the direction of arrow 118 may provide the added advantage of preventing the film 112 from becoming trapped under support roll 140.

The support roll 140 may be provided in a variety of configurations. For example, it may be preferred that the support roll 140 be mounted for free rotation about its axis 142. Alternatively, support roll 140 may be driven to rotate at some speed which is either the same or different than the speed of the apparatus 110 as it moves along substrate 114 during removal of the adhesive film 112. In addition, although a single support roll 140 is illustrated as one preferred mechanism, it will be understood that alternative mechanisms such as multiple rolls, sliding members, or other alternatives may be substituted for the single support roll 140.

The support roll 140 used in the apparatus may preferably include an outer conformable surface that is soft enough to conform to the substrate 114 in response to the compressive forces generated during the removal process. The use of a conformable roll may, for example, serve to disperse the compressive forces over a larger area, thereby reducing the chances for damage to the substrate 114. The conformability may also be useful to prevent damage as the support roll 140 moves over irregularities or compound curves on the substrate 114, e.g., raised or depressed areas, such as rivets or dents.

To improve removal of the adhesive film 112 from the substrate 114, the apparatus 110 may include an optional heating device 150 positioned to heat the adhesive film 112 before it is removed from the substrate 114 when the apparatus 110 is moving in the direction of arrow 117. It may be preferred that the heating device heat the adhesive film 112 over its entire width. Examples of suitable heating devices 150 include, but are not limited to: infrared heaters, resistance heaters, carbon filaments, quartz irradiators, etc. The thermal energy may be transferred to the film 112 by, e.g., a blower used in connection with a resistance heater. The heating device 150 may be mounted on apparatus 110 (e.g., on roll frame 130 as depicted), or it may be provided on a separate support apparatus.

Figure 5:
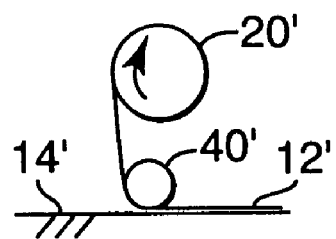
FIGS. 5-7 depict alternative film removal apparatus threading configurations.
Figure 6:
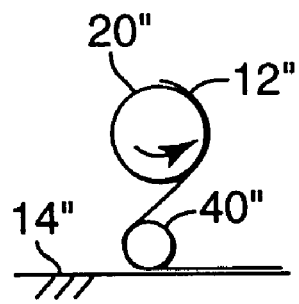

FIGS. 5 and 6 depict variations on the film removal apparatus of the invention in which support rolls 40' and 40" operate in connection with winding rolls 20' and 20", respectively. The adhesive films 12' and 12" are removed from the substrates 14' and 14" along release lines 16' and 16" after passing between the nip formed between the support rolls 40' and 40" and the substrates 14' and 14", respectively. The function of winding the removed adhesive films 12' and 12" is performed by winding rolls 20' and 20". One advantage to these configurations is that the peel angle is controlled by rolls 12' and 12".

Figure 7:
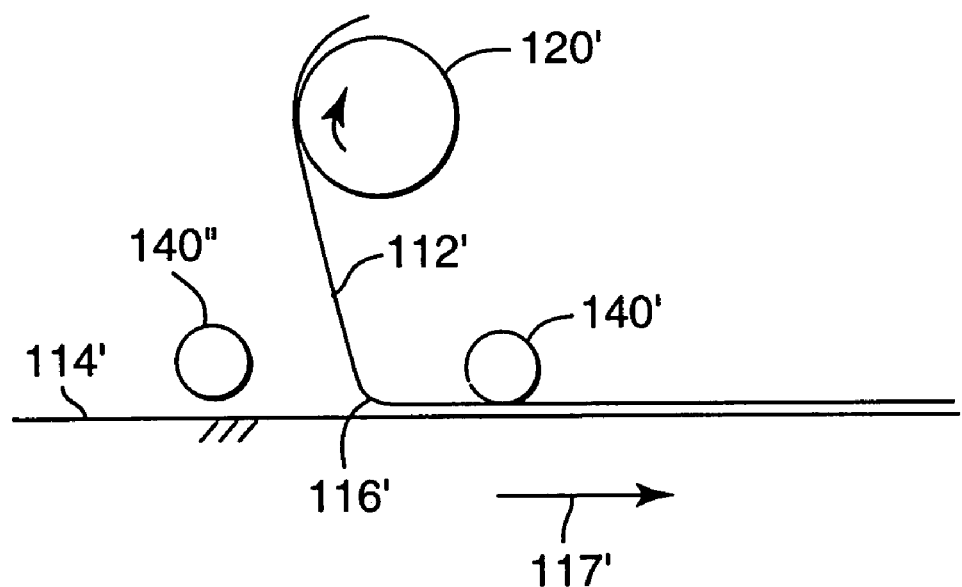

FIG. 7 depicts a variation on the apparatus 110 of FIGS. 3 and 4, in which support roll 140' is located ahead of the release line 116' along which the adhesive film 112' is removed from the substrate 114' as the rolls 120' and 140' move in the direction of arrow 117'. Although the compressive force is located ahead of the release line 116', this configuration may offer some advantages.

For example, if the speed of the winding roll 120' is sufficiently increased relative to the rate at which the entire apparatus is moving in direction 117', the release line 116' may be moved ahead to the support roll 140', resulting in a configuration similar to those depicted in FIGS. 5 and 6. By locating the release line 116' behind the support roll 140', however, the configuration of FIG. 7 offers the opportunity to control peel angle similar to that offered by the apparatus of FIGS. 3 and 4. Another potential advantage of the apparatus of FIG. 7 is that, in those situations in which it is desired to heat the adhesive film 112' before removal, the support roll 140' may be heated. Heating the support roll 140' may offer a particularly effective technique to heat the adhesive film 112' because the combination of heat and pressure may result in more effective heating.

Also depicted in FIG. 7 is an optional secondary support roll 140" located behind the support roll 140' (relative to the travel direction illustrated by arrow 117'). The secondary support roll 140" may be used to distribute the compressive forces over a larger surface area during removal of the adhesive film 112' from the substrate 114'.

Figure 8:
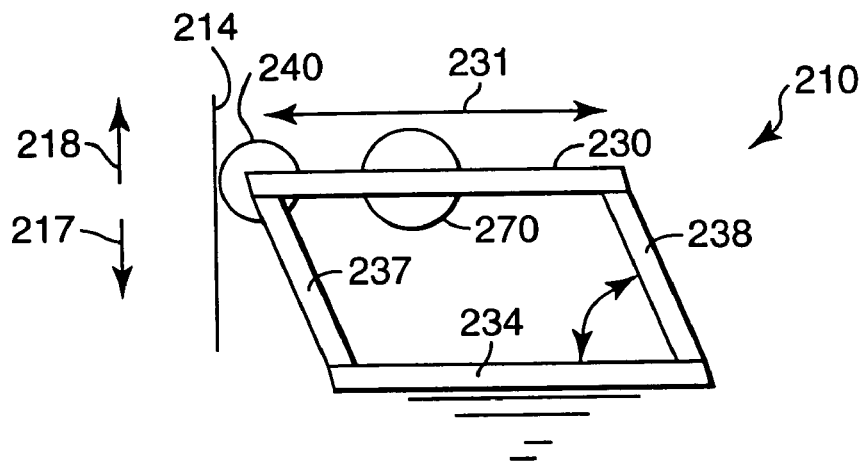
FIG. 8 depicts an alternative film removal apparatus according to the present invention.

FIG. 8 depicts an alternative film removal apparatus including a winding roll 220 and support roll 240 mounted on a roll frame 230 that is rotatably connected to a fixed subframe member 234 by a pair of links 237 and 238. As a result, movement of the rolls 220 and 240 is provided along the direction of arrow 231 as the apparatus 210 moves in the direction of arrows 217 or 218.

Figure 9:
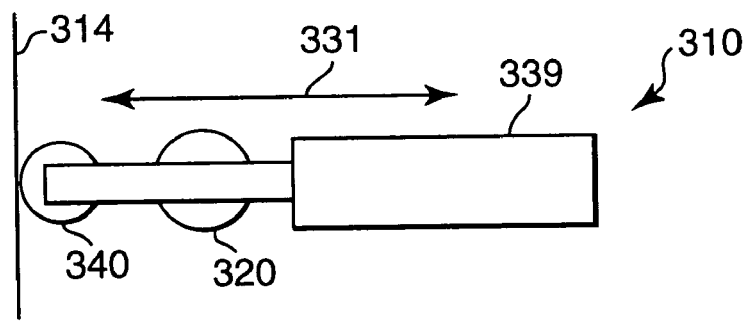
FIG. 9 depicts another alternative film removal apparatus according to the present invention.

FIG. 9 depicts another alternative film removal apparatus 310 in which a winding roll 320 and support roll 340 are mounted on a roll frame 330 that is operably connected to a hydraulic (fluid or gas) cylinder 339. Movement or travel of the roll frame 330 and rolls 320 and 340 may thus be controlled along the direction of arrow 331. Control over movement along arrow 331 may be used to add to the compressive forces generated by the support roll 340 during adhesive film removal. Alternatively, the cylinder 339 may be used to reduce or eliminate any compressive forces that may be applied to the substrate 314 by the support roll 340 by effectively suspending it above the substrate 314. That suspension may also offer another method of controlling peel angle of the adhesive film (not shown) being removed.

Figure 10:
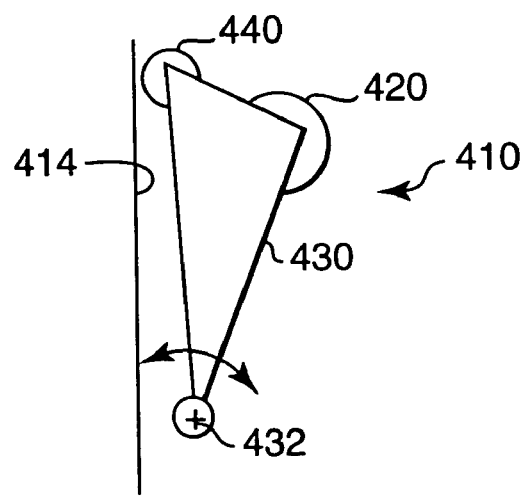
FIG. 10 depicts another alternative film removal apparatus according to the present invention.

FIG. 10 depicts an alternative film removal apparatus 410 that includes a roll frame 430 mounted for rotation about an axis 432. A support roll 440 and winding roll 420 are mounted on the support frame 430 and rotation of the roll frame 430 about axis 432 allows the rolls 420 and 440 to move over discontinuities and irregularities in the substrate 414.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. A method of removing adhesive film from a substrate, the adhesive film comprising first and second ends defining a length and a width transverse to the length, the method comprising:
    applying tension over the width of the adhesive film to remove the adhesive film from the substrate along a release line;
    transferring the tension onto the substrate in the form of a compressive force, wherein the compressive force is applied to the substrate at a distance from the release line;
    varying the distance between the compressive force and the release line; and
    advancing the release line and the compressive force towards the second end of the adhesive film, whereby the adhesive film is removed from the substrate.

2. A method according to claim 1, wherein the compressive force is applied to the substrate behind the release line as the release line advances toward the second end of the adhesive film.

3. A method according to claim 1, wherein the compressive force is applied to the substrate ahead of the release line as the release line advances toward the second end of the adhesive film.

4. A method according to claim 1, wherein varying the distance between the compressive force and the release line comprises varying the tension applied to the adhesive film.

5. A method according to claim 1, wherein the compressive force is applied to the substrate by a roll.

6. A method according to claim 1, wherein applying tension over the width of the adhesive film comprises attaching the first end of the adhesive film to a winding roll and winding the adhesive film thereon.

7. A method according to claim 6, wherein the compressive force is applied to the substrate by a support roll, and further wherein the winding roll and the support roll are located a fixed distance apart.

8. A method according to claim 1, further comprising heating the adhesive film before removing the adhesive film from the substrate along the release line.

9. A method of removing adhesive film from a substrate, the adhesive film comprising first and second ends defining a length and a width transverse to the length, the method comprising:
    attaching the first end of the adhesive film to a winding device;
    rotating the winding device to apply tension over the width of the adhesive film to remove the adhesive film from the substrate along a release line;
    transferring the tension applied to the adhesive film onto the substrate in the form of a compressive force, with the compressive force being applied to the substrate by the winding device and wherein the compressive force is applied to the substrate at a distance from the release line;
    varying the distance between the compressive force and the release line; and
    advancing the release line towards the second end of the adhesive film while winding the adhesive film on the winding device, whereby the adhesive film is removed from the substrate.

10. A method according to claim 9, wherein the adhesive film comprises a large-scale adhesive film.

11. A method according to claim 9, wherein the compressive force is applied to the substrate behind the release line as the release line advances toward the second end of the adhesive film.

12. A method according to claim 9, wherein the compressive force is applied to the substrate ahead of the release line as the release line advances toward the second end of the adhesive film.

13. A method according to claim 9, wherein varying the distance between the compressive force and the release line comprises varying the speed at which the winding device is rotated.

14. A method according to claim 9, further comprising heating the adhesive film before removing the adhesive film from the substrate along the release line.

* * * * *